United States Patent
Seo

(10) Patent No.: US 8,674,945 B2
(45) Date of Patent: Mar. 18, 2014

(54) TOUCH SCREEN APPARATUS AND DIGITAL EQUIPMENT HAVING THE SAME, AND COMMAND-INPUT METHOD THEREOF

(75) Inventor: Dae Sung Seo, Osan-si (KR)

(73) Assignee: LG Electronics Inc., Seoul (KR)

( * ) Notice: Subject to any disclaimer, the term of this patent is extended or adjusted under 35 U.S.C. 154(b) by 1296 days.

(21) Appl. No.: 11/860,372

(22) Filed: Sep. 24, 2007

(65) Prior Publication Data

US 2008/0143684 A1 Jun. 19, 2008

(30) Foreign Application Priority Data

Dec. 18, 2006 (KR) ........................ 10-2006-0129611

(51) Int. Cl.
*G06F 3/041* (2006.01)

(52) U.S. Cl.
USPC ........................................ 345/173; 178/18.01

(58) Field of Classification Search
USPC ............ 345/156–173, 179; 178/18.01, 19.01, 178/20.01; 715/702, 784, 786, 863; 463/37
See application file for complete search history.

(56) References Cited

U.S. PATENT DOCUMENTS

| | | | | |
|---|---|---|---|---|
| 4,914,624 | A * | 4/1990 | Dunthorn | 345/173 |
| 5,825,352 | A * | 10/1998 | Bisset et al. | 345/173 |
| 7,053,887 | B2 * | 5/2006 | Kraus et al. | 345/173 |
| 7,479,949 | B2 * | 1/2009 | Jobs et al. | 345/173 |
| 7,658,675 | B2 * | 2/2010 | Hotta | 463/37 |
| 2003/0080946 | A1 | 5/2003 | Chuang | |
| 2003/0085882 | A1 * | 5/2003 | Lu | 345/173 |
| 2004/0125088 | A1 | 7/2004 | Zimmerman et al. | |
| 2006/0007176 | A1 | 1/2006 | Shen | |
| 2006/0022956 | A1 * | 2/2006 | Lengeling et al. | 345/173 |
| 2006/0026521 | A1 * | 2/2006 | Hotelling et al. | 715/702 |
| 2006/0031786 | A1 | 2/2006 | Hillis et al. | |

FOREIGN PATENT DOCUMENTS

| | | |
|---|---|---|
| EP | 1100013 A2 | 5/2001 |
| WO | WO 96/24095 A1 | 8/1996 |

OTHER PUBLICATIONS

Benko et al., "Precise Selection Techniques for Multi-Touch Screens," CHI 2006 Proceedings, Interacting with Large Surfaces, Apr. 22-27, 2006, pp. 1263-1272, XP007917751.

Dietz et al., "DiamondTouch: A Multi-User Touch Technology," Proceedings of the 14th Annual Symposium on User Interface Software and Technology, Nov. 11-14, 2001, pp. 219-226, XP002553203.

* cited by examiner

*Primary Examiner* — William Boddie
*Assistant Examiner* — Mansour M Said
(74) *Attorney, Agent, or Firm* — Birch, Stewart, Kolasch & Birch, LLP

(57) ABSTRACT

The present invention relates to a touch screen apparatus and a method of inputting a user command through the apparatus. A touch screen apparatus of the present invention comprises an input unit 10 having a sensing unit 12 for recognizing user's touches and converting the touches into electrical signals; a storage unit 30 for storing execution commands corresponding to relative positions of the successive touches; and a control unit 20 for receiving the signals from the sensing unit 12 and executing an execution command retrieved from the storage unit. According to the present invention constructed as such, a variety of execution commands can be inputted without using a pattern of touches rather than an input area narrowly partitioned in a screen space.

22 Claims, 6 Drawing Sheets

TOUCH SCREEN APPARATUS AND DIGITAL EQUIPMENT HAVING THE SAME, AND COMMAND-INPUT METHOD THEREOF

BACKGROUND OF THE INVENTION

1. Field of the Invention

The present invention relates to a touch screen apparatus and digital equipment having the same, and a command-input method thereof.

2. Description of the Related Art

Recently, navigation devices, personal multimedia players (PMPs), MP3 players, cellular phones and the like tend to be miniaturized in size so as to be easily moved and carried. Accordingly, instead of a conventional key button input method, a touch screen method is employed so that a user can more conveniently select and input information. In the touch screen method, a user can interface with a computer through a screen and directly input or output information, wherein when a user's finger or an object touches a character displayed on the screen or a specific point on the screen, the coordinates of the touch point are recognized. Then, a specific process corresponding to a menu at the selected coordinates is performed by software using the coordinates. Accordingly, the touch screen serves as an input unit as well as an information display unit.

In a portable information terminal employing such a touch screen, a selection menu displayed on the screen should be touched by a stylus pen or a fingertip.

However, the aforementioned conventional technique has the following problems.

That is, in order to display menus on the screen and to select and execute a certain menu in the portable information terminal employing such a touch screen described above, the menu should be directly touched on the touch screen. Thus, all the menus should be displayed. Accordingly, there is a problem in that all the menus are displayed on the screen, resulting in a complicated screen configuration.

Meanwhile, as the portable information terminal is gradually miniaturized, the size of the screen is also decreased. Accordingly, the size of a menu displayed on the screen also becomes smaller. Therefore, there is a problem in that it is difficult for a user to exactly touch the small menu, resulting in frequent input errors.

SUMMARY OF THE INVENTION

The present invention is conceived to solve the aforementioned problems in the related art. Accordingly, an object of the present invention is to provide a touch screen apparatus and digital equipment having the same, and a command-input method thereof, wherein a variety of execution commands can be executed according to promised touch patterns.

Another object of the present invention is to provide a touch screen apparatus and digital equipment having the same, and a command-input method thereof, wherein the apparatus is not operated through an exact touch to a point but an execution command is inputted using a pattern of successive touches.

According to an aspect of the present invention for achieving the objects, there is provided a touch screen apparatus comprising an input unit having a sensing unit for recognizing inputs of user's input signals and converting the input signals into electrical signals; a storage unit for storing execution commands corresponding to relative positions of two or more input signals; and a control unit for receiving the input signals from the sensing unit, retrieving an execution command corresponding to the input signals from the storage unit, and executing the retrieved execution command.

At this time, the execution commands stored in the storage unit may be stored in a form of a table categorized according to the number of successive inputs of the input signals and the relative positions of the input signals.

The number of successive inputs of the input signals may be the number of inputs successively inputted within a preset time interval.

The relative positions of the input signals may be calculated based on an input position of an initially inputted input signal.

The input signals may be divided into a long touch and a short touch depending on whether the duration of each of the input signals exceeds a specified time value.

The control unit may detect both the input of the user's input signal and release of the input of the input signal. If a final input signal among the plurality of input signals is a long touch, the control unit may continuously execute a corresponding execution command until the input of the final input signal is released.

According to another aspect of the present invention, there is provided a digital equipment comprising a touch screen apparatus that includes an input unit having a sensing unit for recognizing inputs of user's input signals and release of the inputs of the input signals and converting the input signals into electrical signals; a storage unit for storing execution commands corresponding to relative positions of two or more input signals; and a control unit for receiving the input signals from the sensing unit, retrieving an execution command corresponding to the input signals from the storage unit, and executing the retrieved execution command.

At this time, the execution commands stored in the storage unit may be stored in a form of a table categorized according to the number of successive inputs of the input signals and the relative positions of the input signals.

The relative positions of the input signals may be recognized as one of four directions, including up, down, left and right, based on an initially inputted input signal.

If a final input signal among the plurality of input signals is a long touch that is inputted over a specified time value, the control unit may continuously execute a corresponding execution command until the input of the final input signal is released.

The touch screen apparatus of the equipment may further comprise a buffer memory for storing information on input positions of the successive input signals, relative positions between the input signals, and the types of the input signals, from a time point when input of a user's initial input signal is detected to a time point when input of the successive input signals is completed.

According to a further aspect of the present invention, there is provided a method of inputting a command in a touch screen apparatus, comprising the steps of: (A) receiving an input signal or input signals; (B) determining whether at least two input signals are inputted; (C) if it is determined in step (B) that at least two input signals are inputted, determining relative positions of the input signals based on reference position information contained in the input signals; (D) retrieving an execution command corresponding to a result of the determination in step (C); and (E) executing the retrieved execution command.

At this time, step (B) may comprise the steps of: (B1) determining whether a preset time is elapsed after an input signal is inputted; (B2) if it is determined that the preset time is not elapsed, waiting for input of another input signal; and (B3) if it is determined that the preset time is elapsed, determining whether at least two input signals are inputted.

Step (B) may further comprise the step of storing input positions of the input signals in a buffer memory.

If a corresponding execution command does not exist in step (D), execution of the corresponding command may not be performed.

The method may further comprise the steps of (F) after executing a user command (the execution command), confirming whether a finally inputted input signal is a long touch; (G) if it is determined that the finally inputted input signal is a long touch, checking whether release of the input of the finally inputted input signal is detected; and (H) performing step (E) if release of the input of the finally inputted input signal is not detected, and deleting data stored in the buffer memory if release of the input of the finally inputted input signal is detected.

The execution commands stored in the storage unit may be stored in a form of a table categorized according to the number of successive inputs of the input signals and the relative positions of the input signals.

The relative positions of the input signals may be determined in step (C) by recognizing the relative positions as one of four directions, including up, down, left and right, based on an input position of an initially inputted input signal.

At this time, the preset time in step (B1) may be defined by a user's input.

With digital equipment provided with a touch screen apparatus according to the present invention described above in detail, it can be expected to obtain the following effects.

That is, since a variety of execution commands are executed according to promised touch patterns in the present invention, there is an advantage in that a variety of execution commands can be correctly inputted even in touch panel electronic equipment having a small input unit.

Further, since a desired execution command can be inputted in the present invention without looking at a screen in order to input a command, convenience of use is improved. Particularly, in case of a navigation device mounted in a vehicle, there is an advantage in that a driver can safely input an execution command while looking ahead.

DETAILED DESCRIPTION OF THE INVENTION

Figure 1:
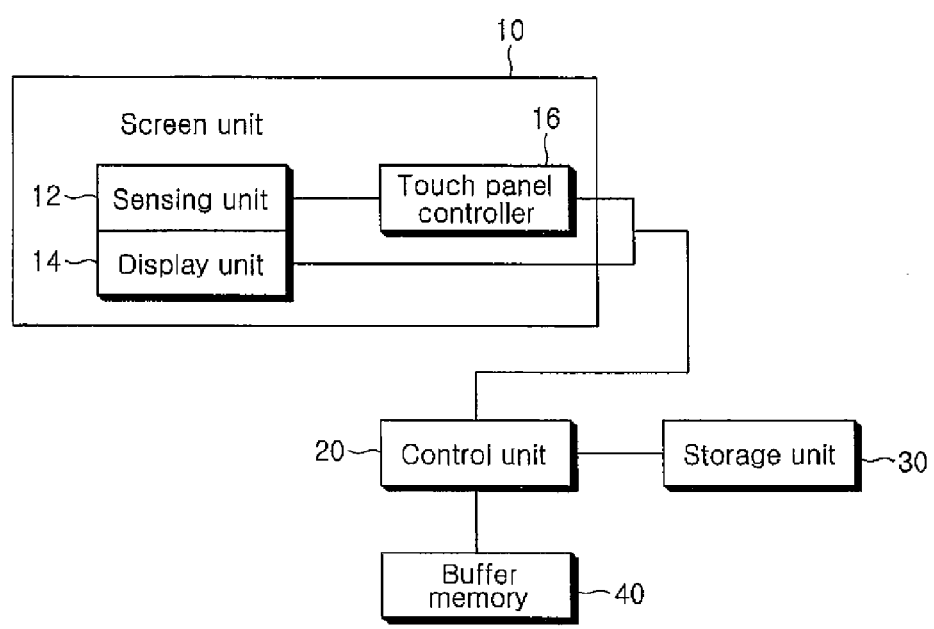
FIG. 1 is a block diagram showing a configuration of a preferred embodiment of the present invention.

Hereinafter, preferred embodiments of a touch screen apparatus and a command-input method thereof according to the present invention will be described in detail with reference to the accompanying drawings.

The term "input signal" used herein means a user's input. That is, the meaning of input of an input signal in a touch screen apparatus includes a variety of input methods including an input through a touch on a touch screen. However, for the sake of convenience of explanation, description will be made hereinafter on the assumption that input of an input signal means a user's touch input. Accordingly, the terms 'touch' and 'input of an input signal' described below (and illustrated in the drawings) are used in the same meaning.

The touch screen apparatus according to the present invention can be applied to a variety of digital equipment. However, for the sake of convenience of explanation, a touch screen apparatus mounted on a navigation device will be described hereinafter by way of example.

Figure 2:
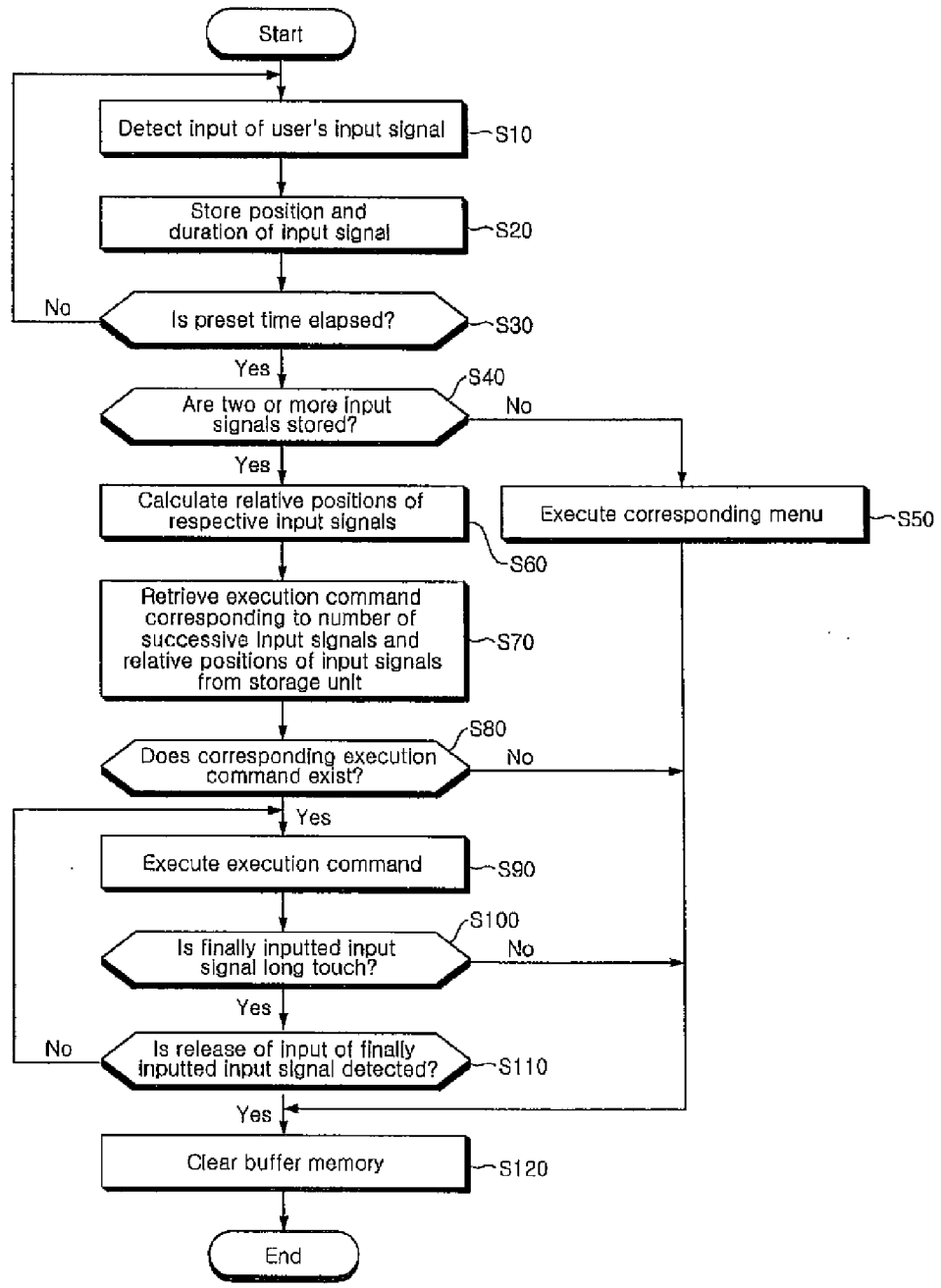
FIG. 2 is a flowchart illustrating an operation method of the preferred embodiment of the present invention.
Figure 3A:
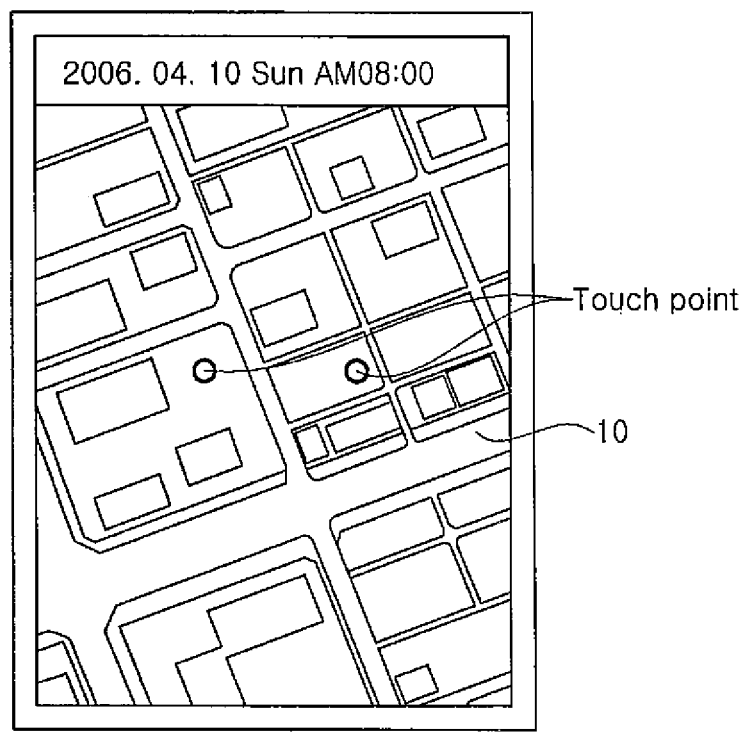
FIGS. 3*a* to 3*c* are exemplary views showing operations of the preferred embodiment of the present invention.
Figure 3B:
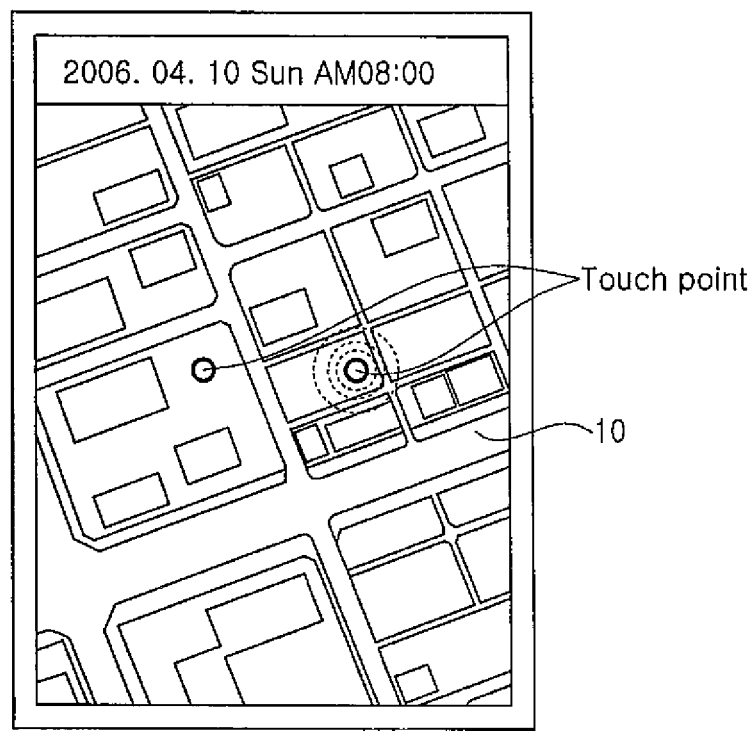
Figure 3C:
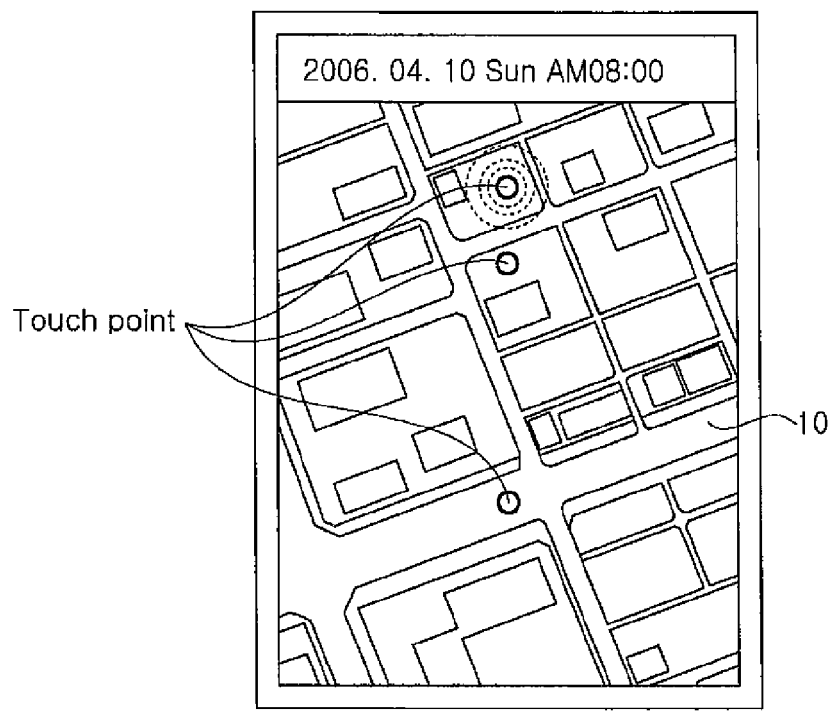
Figure 4:
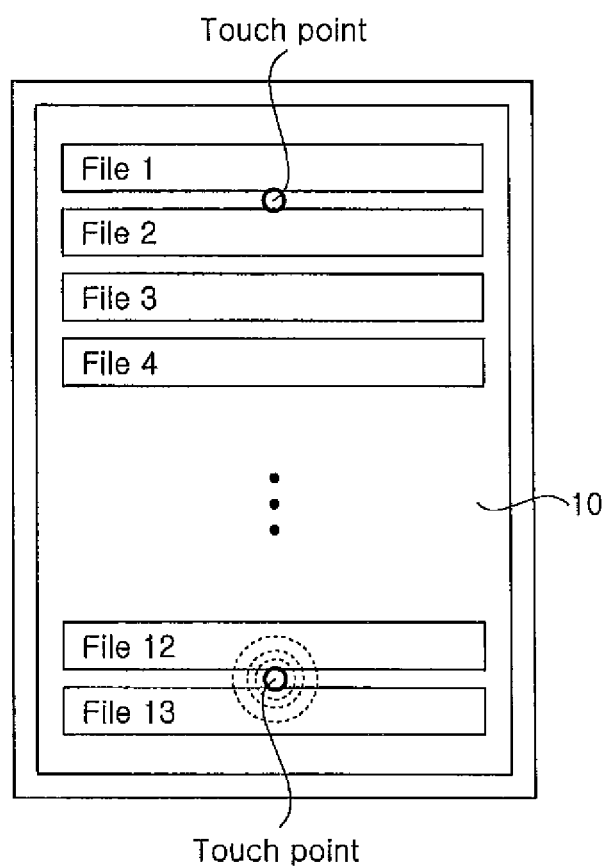
FIG. 4 is an exemplary view showing a state where the preferred embodiment of the present invention is operated in another mode.

FIG. 1 is a block diagram showing a configuration of a preferred embodiment of the present invention, FIG. 2 is a flowchart illustrating an operation method of the preferred embodiment of the present invention, FIGS. 3*a* to 3*c* are exemplary views showing operations of the preferred embodiment of the present invention, and FIG. 4 is an exemplary view showing a state where the preferred embodiment of the present invention is operated in another mode.

As shown in FIG. 1, the touch screen apparatus of the present invention includes an input unit 10 for performing functions of inputting and displaying information. The input unit 10 includes a display unit 14 for displaying a plurality of pieces of menu information (icons, etc.) and data thereon, and a sensing unit 12 for detecting a touch action that selects a menu or data displayed on the display unit 14. When a user touches the input unit 10 to select a menu or data displayed on the input unit 10 using a fingertip or a stylus pen, the sensing unit 12 detects the touch action.

At this time, the display unit 14 is a general display device that may be one of various display devices such as a liquid crystal display (LCD), a plasma display panel (PDP), a light emitting diode (LED) and an organic light emitting diode (OLED). The sensing unit 12 is provided in the form of a thin layer on a front surface of the display unit 14*a* to form a resistive or capacitive type touch screen. It will be apparent that a touch screen using an infrared beam or the like may be employed. However, the resistive or capacitive type touch screen is preferably used.

In the resistive type touch screen, two films coated with a resistive material are provided with a certain gap maintained therebetween, and an electrical current is applied to both the films. At this time, if pressure is applied to one of the films and thus the two films are brought into contact with each other, the amount of the flowing current is changed. The change of the current is sensed to detect a touch point. On the other hand, in the capacitive type touch screen, a conductive metallic material is coated on both sides of a glass panel, and a voltage is applied to corners. At this time, a high frequency wave flows in the touch screen, and the waveform of the high frequency wave is distorted if a finger touches the touch screen. The distortion is sensed to detect a touch point.

The sensing unit 12 is provided with a touch panel controller 16 for sensing the distortion of the waveform of the high frequency wave and converting the distortion into an electrical signal. The touch panel controller 16 controls the operation of the sensing unit 12, detects touch information (touch point and time) and the like, converts the touch information into an electrical signal, and transmits the electrical signal to a control unit 20.

The control unit 20 for accessing a corresponding execution command in a storage unit 30 and displaying the execution command on the display unit 10 according to a detection result of the sensing unit 12 is connected to the input unit 10.

The control unit 20 controls both the aforementioned displaying operation and overall operations of digital equipment. The control unit operates the digital equipment according to the detection result of the sensing unit 12.

Meanwhile, the storage unit 30 for storing user commands, which are set according to relative positions of a plurality of touches and the types of touches, is connected to the control unit 20. The execution commands to be executed by the control unit 20 are stored in the storage unit 30. Preferably, the storage unit stores execution commands that are categorized by operation mode and correspond to the number of successive touches, relative positions of the touches, and the types of touches.

At this time, the number of successive touches is the number of touches inputted within a preset time value, and a touch inputted within a preset time value means the next touch inputted before the preset time value is elapsed after a previous touch has been inputted, and touches inputted within the preset time value after the next touch has been inputted. That is, this means that the intervals between touches do not exceed the preset time value. It is preferred that the time value be set by a user.

In addition, the types of touches are categorized by touch duration and preferably categorized into a short touch inputted in a time smaller than a specified time value and a long touch inputted in a time larger than the specified time value. At this time, it is also preferred that the time value be specified by a user.

Moreover, a buffer memory 40 for storing information on a touch until an execution command corresponding to the touch is executed after the touch has been inputted is preferably connected to the control unit 20. Accordingly, the contents stored in the buffer memory 40 are preferably deleted after the execution command is executed.

Meanwhile, the execution commands stored in the storage unit 30 are preferably stored in the form of a table. A specific example thereof will be described in detail when an embodiment of the present invention is described later.

Hereinafter, the operation of a preferred embodiment of the present invention constructed as above will be described in detail according to a command-input method thereof.

As shown in FIG. 2, the touch screen apparatus according to the present invention starts to operate by detecting a user's touch through the sensing unit 12 (S10).

Next, information on the position of the touch input and the duration of the touch is stored in the buffer memory 40 (S20). This is to easily fetch touch data upon calculation of relationship among successive touches that are subsequently inputted.

Next, it is checked whether a preset time is elapsed after the touch (S30). This is to determine whether input of the successive touches is completed. That is, if a new touch is not inputted until the preset time is elapsed after a previous touch, it is determined that input of successive touches is completed.

If the number of successive touches is set to a number such as two or three, step S30 is not needed. However, if the various numbers of successive inputs are intended to be utilized, step S30 is needed since whether user's successive inputs are completed should be recognized.

As described above, it is preferred that the time value be set or changed by a user.

Then, it is determined whether the number of successive touches is two or more (S40). At this time, if the number of successive touches is less than two, i.e., if successive touches are not inputted but only one touch is inputted, a corresponding menu displayed on the input unit 10 is executed in the same manner as a conventional touch input method (S50).

On the other hand, if the number of successive touches is two or more, relative positions of the respective touches are calculated (S60).

The relative positions are calculated with respect to the position of an initially inputted touch (reference position). That is, the relative positions are determined by finding X-axis movement values and Y-axis movement values of the positions of second and subsequent touches with respect to the reference position. At this time, if the X-axis and Y-axis movement values are considerably small values (that can be defined by a user), the touches can be considered as touches inputted at the same position.

In addition, based on the X-axis and Y-axis movement values, the relative position can be determined simply as left, right, up or down. That is, it is determined whether the relative position is left/right or up/down by comparing absolute values of the X-axis and Y-axis movement values with each other, and the relative position can be determined as one of left, right, up and down according to the sign of the X-axis or Y-axis movement value. This is to minimize an input error by simplifying the relative position of an inputted touch.

Meanwhile, after the relative positions between the touches are calculated, an execution command corresponding to the number of successive touches, relative positions between the touches, and the types of the touches is retrieved from the storage unit 30 (S70).

At this time, the execution commands stored in the storage unit 30 are categorized by mode and stored in the form of a table according to the number of successive touches, relative positions between the touches, and the types of the touches. The table can be constructed in a variety of ways according to the intention of a user or manufacturer, the purpose of usage and the like, and a specific example thereof will be described in detail when an embodiment of the present invention is described later.

Here, it is determined whether an execution command corresponding to the pattern of inputted touches exists in the storage unit 30 (S80). If a corresponding execution command does not exist, the operation is stopped without executing an execution command.

If a corresponding execution command corresponding to the pattern of inputted touches exists, the execution command is executed (S90).

Next, it is determined whether a finally inputted touch is a long touch (S100). That is, the type of the final touch is determined. If the final touch is a short touch, data stored in the buffer memory are deleted (S120) and the operation is stopped.

However, if the type of the final touch is a long touch, it is determined whether the final touch has been released (S110).

Then, if the final touch has not been released, the execution command is continuously executed. If the final touch has been released, the data stored in the buffer memory are deleted (S120) and the operation is stopped.

Examples of the operation of the present invention performed as above are shown in FIGS. 3*a* to 3*c* and 4. Here, FIGS. 3*a* to 3*c* are views showing the operation of the present invention performed in a map search mode, and FIG. 4 shows an example of the operation of the present invention performed in a menu selection mode.

Hereinafter, the operation of the present invention performed in the map search mode will be first described from the viewpoint of a user.

First, as shown in FIG. 3*a*, the user touches the input unit 10 with his/her finger. It will be apparent that it is possible to touch the input unit using a stylus pen or the like other than the finger.

At this time, touches at points marked with circles mean short touches, and all the touches are successive touches within a preset time value.

The control unit recognizes a user's screen touch, and touches shown in the figure are recognized as 'rightward short touches'. Here, for the sake of convenience of explanation, the upper side is expressed as 'U', the lower side is expressed as 'D', the left side is expressed as 'L', and the right side is expressed as 'R'. Further, a short touch is expressed as 'S', and a long touch is expressed as 'L'.

Accordingly, the touches shown in FIG. 3a are recognized as 'RS'.

The control unit 20 searches the storage unit 30 and retrieves an execution command corresponding to the 'RS'.

At this time, an example (a map search mode) of execution commands stored in the storage unit 30 in the form of a table is shown in Table 1 below.

displayed map screen is shifted rightward at a rate of 50 mm/s. Thereafter, if the second touch is released, the shift of the screen is stopped.

Meanwhile, FIG. 3c shows input of three successive touches. It is assumed in the figure that the touches are sequentially inputted from the lower side to the upper side.

The successive touches shown in the figure correspond to 'UUL'. In Table 1, the UUL corresponds to a user command for shifting the screen upward at 100 mm/s. Accordingly, the

TABLE 1

Map search mode

| Number of successive touches | Position of second touch | | Type of touch | Execution command |
|---|---|---|---|---|
| Twice | U | | S | Shift screen upward by 50 mm |
| | U | | L | Shift screen upward at 50 mm/s |
| | D | | S | Shift screen downward by 50 mm |
| | D | | L | Shift screen downward at 50 mm/s |
| | R | | S | Shift screen rightward by 50 mm |
| | R | | L | Shift screen rightward at 50 mm/s |
| | L | | S | Shift screen leftward by 50 mm |
| | L | | L | Shift screen leftward at 50 mm/s |

| | Position of second touch | Position of third touch | Type of touch | Execution command |
|---|---|---|---|---|
| Three times | U | U | S | Shift screen upward by 100 mm |
| | | | L | Shift screen upward at 100 mm/s |
| | | R | S | Shift screen rightward by 100 mm |
| | | | L | Shift screen rightward at 100 mm/s |
| | | L | S | Shift screen leftward by 100 mm |
| | | | L | Shift screen leftward at 100 mm/s |
| | D | Omitted | Omitted | Omitted |
| | R | Omitted | Omitted | Omitted |
| | L | Omitted | Omitted | Omitted |

In Table 1 above, since 'RS' corresponds to a command for shifting the screen rightward by 50 mm, the map screen displayed on the input unit 10 is shifted rightward by 50 nm.

On the other hand, marked touches shown in FIG. 3b represent 'RL', wherein a circle including afterimages means a long touch.

Accordingly, since the 'RL' in Table 1 means an execution command for shifting the screen rightward at 50 mm/s, the screen is shifted upward twice as fast as the cases of FIGS. 3a and 3b. If the third touch is released, the shift of the screen is stopped as described above.

Meanwhile, FIG. 4 shows the operation of the present invention performed in the menu selection mode.

In the menu selection mode, a table suitable for the menu selection mode is stored. An example of the table is shown in Table 2 below.

TABLE 2

Menu selection mode

| Number of successive touches | Position of second touch | | Type of touch | Execution command |
|---|---|---|---|---|
| Twice | U | | S | Shift selection menu upward by 50 mm |
| | U | | L | Shift selection menu upward at 50 mm/s |
| | D | | S | Shift selection menu downward by 50 mm |
| | D | | L | Shift selection menu downward at 50 mm/s |
| | R | | S | Shift selection menu rightward by 50 mm |
| | R | | L | Shift selection menu rightward at 50 mm/s |
| | L | | S | Shift selection menu leftward by 50 mm |
| | L | | L | Shift selection menu leftward at 50 mm/s |

| | Position of second touch | Position of third touch | Type of touch | Execution command |
|---|---|---|---|---|
| Three times | U | U | S | Shift selection menu upward by 100 mm |
| | | | L | Shift selection menu upward at 100 mm/s |
| | | R | S | Shift selection menu rightward by 100 mm |
| | | | L | Shift selection menu rightward at 100 mm/s |
| | | L | S | Shift selection menu leftward by 100 mm |
| | | | L | Shift selection menu leftward at 100 mm/s |

TABLE 2-continued

Menu selection mode

| Number of successive touches | Position of second touch | Type of touch | Execution command |
|---|---|---|---|
| | D | Omitted | Omitted | Omitted |
| | R | Omitted | Omitted | Omitted |
| | L | Omitted | Omitted | Omitted |

Since the touches shown in FIG. 4 are 'DL' (on the assumption that the upper point is first touched), it is understood through a search of the execution commands in Table 2 that the touches correspond to a command for shifting the selection menu downward at 50 mm/s.

Thereafter, if the second touch is released while the selection menu is moved downward, the shift of the selection menu is stopped.

Although the execution commands have been very limitedly described above by way of example, the execution commands can be set and stored in a various manners. That is, various kinds of execution commands, such as control of sound volume and setting of a playback location and speed during playback of a variety of files, can be inputted according to the present invention.

The scope of the present invention is not limited to the embodiments described above but defined by the appended claims. It will be apparent to those skilled in the art that various adaptations and changes can be made thereto within the scope of the present invention defined by the appended claims.

What is claimed is:

1. A method of controlling a touch screen, comprising:
   determining whether at least two input signals are inputted;
   when it is determined that at least two input signals are inputted, determining relative positions of the input signals based on reference position information contained in the input signals;
   retrieving an execution command based on the determined relative positions of the input signals; and
   executing the retrieved execution,
   wherein the step of determining whether at least two input signals are inputted comprises the steps of:
      determining whether a preset time is elapsed after an input signal is inputted to a touch screen;
      when it is determined that the preset time is not elapsed, waiting for an input of another input signal to the touch screen; and
      when it is determined that the preset time is elapsed, determining whether at least two input signals are inputted.

2. A touch screen apparatus, comprising:
   a display unit equipped with a touch-sensing unit;
   a storage unit to store commands; and
   a control unit configured to
      detect at least one touch input, and
      retrieve and execute a corresponding command based on whether the detected at least one touch input includes only one touch input or two or more successive touch inputs,
   wherein, when the detected at least one touch input includes the two or more successive touch inputs, the corresponding command is determined based on a position of a last touch input of the two or more successive touch inputs relative to a position of another of the two or more successive touch inputs, and
   wherein the two or more successive touch inputs are determined by determining whether a preset time is elapsed after a touch input to the display unit is detected;
   when it is determined that the preset time is not elapsed waiting for another touch input to the display unit; and
   when it is determined that the preset time is elapsed, determining whether the two or more successive touch inputs are detected.

3. The apparatus as claimed in claim 2, wherein the control unit is configured to determine the command to be retrieved based on both a number of the two or more successive touch inputs and the position of the last touch input of the two or more successive touch inputs relative to the position of the another of the two or more successive touch inputs.

4. The apparatus as claimed in claim 2,
   wherein the two or more successive touch inputs include a first touch input followed by a second touch input, and
   wherein the second touch input is the last touch input.

5. The apparatus as claimed in claim 4,
   wherein the control unit is configured to:
      determine the command based on the relative position of the last touch input and based on a number of the first and second touch inputs, and
      execute the command based on the last touch.

6. The apparatus as claimed in claim 2, wherein the two or more successive touch inputs include a first touch input followed by a second touch input followed by the last touch input.

7. The apparatus as claimed in claim 6, wherein the control unit is configured to:
   determine the command based on the position of the last touch input and based on both a number and a relative position of the first and second touch inputs, and
   execute the command based on the last touch input.

8. A method of displaying data, comprising:
   displaying data on a display unit equipped with a touch-sensing unit;
   determining whether at least two successive touch inputs are detected in sequence during a preset time via the touch-sensing unit; and
   when the at least two input signals are detected in sequence, executing a command for controlling the displaying, according to a position of a last touch input of the at least two input signals relative to a position of another of the at least two input signals,
   wherein the step of determining whether at least two successive touch inputs are detected in sequence comprises the steps of:
      determining whether a preset time is elapsed after a touch input to the display unit is detected;
      when it is determined that the preset time is not elapsed, waiting for another touch input to the display unit; and
      when it is determined that the preset time is elapsed, determining whether the at least two touch inputs are detected.

9. A portable terminal, comprising:
a display unit equipped with a touch-sensing unit; and
a controller configured to:
  detect two or more successive touches on the display unit via the touch-sensing unit, wherein the two or more successive touches are determined by:
  determining whether a preset time is elapsed after a touch to the display unit is detected;
  when it is determined that the preset time is not elapsed, waiting for another touch to the display unit; and
  when it is determined that the preset time is elapsed, determining whether the two or more successive touches are detected;
    retrieve and execute a command based on relative positions of the two or more successive touches;
    determine whether a last touch of the detected two or more successive touches correspond to a long-time touch; and
    when the last touch of the detected two or more successive touches does correspond to the long-time touch, continue to execute the command until the long-time touch is released.

10. The portable terminal of claim 9, wherein the touch-sensing unit is provided in the form of a thin layer on a surface of the display unit.

11. The portable terminal of claim 9,
wherein the detected two or more successive touches comprise a first touch followed by a second touch,
wherein the second touch is the last touch of the two or more successive touches, and
wherein the command is retrieved based on relative positions of the first and last touch.

12. The portable terminal of claim 9,
wherein the detected two or more successive touches comprise a first touch followed by a second touch followed by a third touch, and
wherein the third touch is the last touch of the two or more successive touches.

13. The portable terminal of claim 12, wherein the controller is configured to:
determine the command based on relative positions of at least the first and second touches, and
execute the determined command based on the third touch.

14. The portable terminal of claim 9, wherein the controller is configured to display a marker at a position corresponding to at least one of the detected two or more successive touches.

15. The portable terminal of claim 14, wherein the marker includes an afterimage caused by the at least one of the detected two or more successive touches.

16. The portable terminal of claim 9, wherein the detected two or more successive touches comprise two or more successive touch inputs that are detected during a preset time.

17. The portable terminal of claim 16, wherein the command is executed based on relative positions and a number of the two or more successive touches.

18. The portable terminal of claim 9,
wherein the long-time touches comprise touches being inputted for a time longer than a specified time value, and
wherein the short-time touches comprise touches being inputted for a time shorter than a specified time value.

19. The portable terminal of claim 9, wherein the display unit displays a screen related to a map and the command is for controlling the screen.

20. A portable terminal, comprising:
a display unit;
a touch-sensing unit; and
a controller configured to:
  detect two or more successive touches on the display unit via the touch-sensing unit, wherein the two or more successive touches are determined by:
  determining whether a preset time is elapsed after a touch to the display unit is detected;
  when it is determined that the preset time is not elapsed, waiting for an input of another touch to the display unit; and
  when it is determined that the preset time is elapsed, determining whether the two or more successive touches are detected,
    select a command among plural commands based on a number of the detected two or more successive touches and a relative position of the two or more successive touches, and
    execute the selected command.

21. The portable terminal of claim 20, wherein the controller is configured to:
detect a first touch of the two or more successive touches at a first position on the display unit via the touch-sensing unit, and
subsequent to detecting the first touch, detect another of the two or more successive touches at a second position on the display unit via the touch-sensing unit.

22. A portable terminal, comprising:
a display unit;
a touch-sensing unit; and
a controller configured to:
  determine whether at least two input signals are inputted,
  when it is determined that at least two input signals are inputted, determine relative positions of the input signals based on reference position information contained in the input signals,
  retrieve an execution command based on the determined relative positions of the input signals, and
  executing the retrieved execution,
  wherein, in determining whether at least two input signals are inputted, the controller is configured to:
    determine whether a preset time is elapsed after an input signal is inputted to a touch screen,
    when it is determined that the preset time is not elapsed, wait for an input of another input signal to the touch screen, and
    when it is determined that the preset time is elapsed, determine whether at least two input signals are inputted.

* * * * *